United States Patent
Bygdnes

[15] 3,667,435
[45] June 6, 1972

[54] VEHICULAR ENGINE BRAKE ASSEMBLY

[72] Inventor: Richard M. Bygdnes, Atherton, Calif.

[73] Assignee: said Richard M. Bygdnes, by said Perry A. Bygdnes

[22] Filed: Apr. 13, 1970

[21] Appl. No.: 27,666

Related U.S. Application Data

[63] Continuation-in-part of Ser. No. 797,841, Feb. 10, 1969, abandoned.

[52] U.S. Cl.........................123/97 B, 123/182, 180/30, 180/92
[51] Int. Cl.........................................................F01l 13/08
[58] Field of Search.................123/182, 97 B; 180/30, 92

[56] References Cited

FOREIGN PATENTS OR APPLICATIONS

| | | | |
|---|---|---|---|
| 4,935 | 1913 | Great Britain | 123/182 |
| 106,561 | 5/1917 | Great Britain | 123/182 |
| 667,770 | 6/1929 | France | 123/182 |

OTHER PUBLICATIONS

Cycle Magazine Sept. 1968 pages 73, 74, 75

Primary Examiner—Wendell E. Burns
Attorney—Flehr, Hohbach, Test, Albritton & Herbert

[57] ABSTRACT

An engine brake for a two-cycle engine equipped vehicle is operative through selective venting of the engine's combustion chamber and includes a plug with an actuable poppet valve arranged in a passageway communicating with the combustion chamber. In one form, a collector receives gases passing from the passageway, the collector being in communication with a conduit extending to a controlled air source so that gases passing to and from the combustion chamber to the atmosphere pass through the controlled air source. In another form, a one-way check valve permits gas discharge but impedes entry of airborne particles into the combustion chamber.

9 Claims, 7 Drawing Figures

PATENTED JUN 6 1972
3,667,435
SHEET 1 OF 2
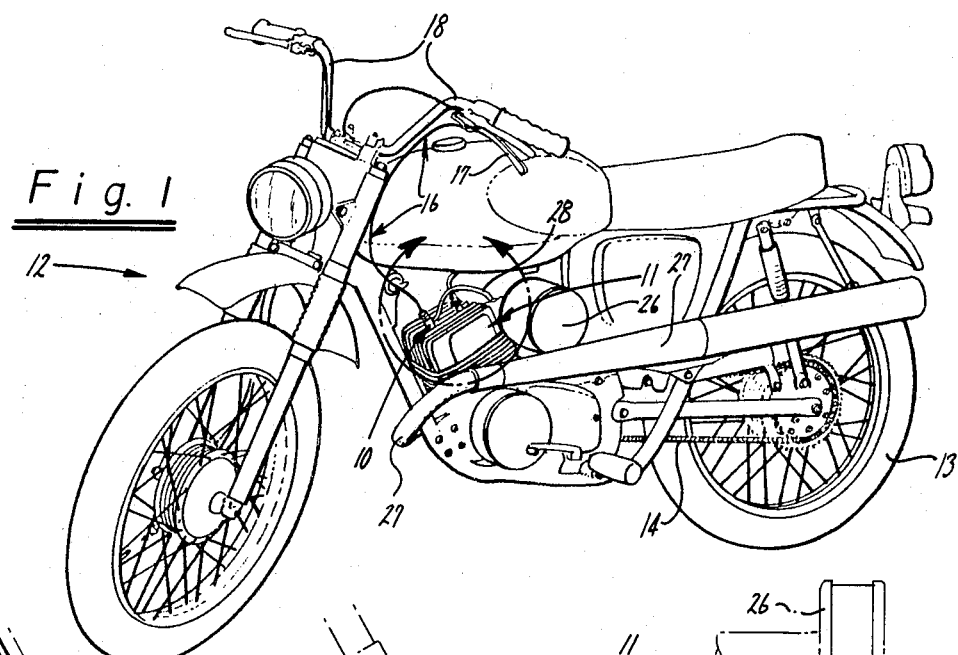
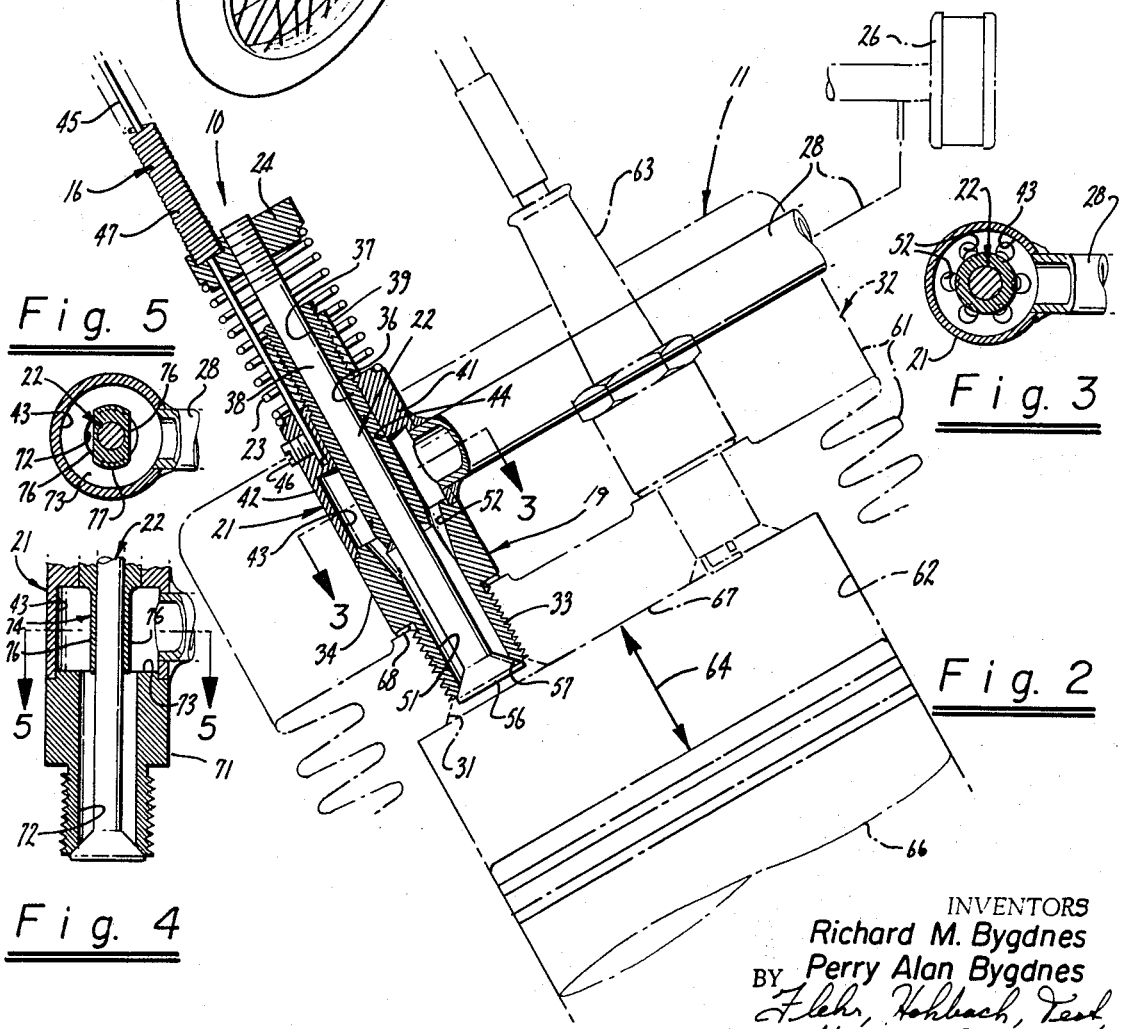
INVENTORS
Richard M. Bygdnes
Perry Alan Bygdnes
BY Flehr, Hohbach, Test,
Albritton & Herbert
Attorneys INVENTOR.
Richard M. Bygdnes
BY Perry Alan Bygdnes
Flehr, Hohbach, Test,
Albritton & Herbert
Attorneys

# 3,667,435

VEHICULAR ENGINE BRAKE ASSEMBLY

CROSS-REFERENCE TO RELATED APPLICATION

This application is a continuation-in-part of copending application, Ser. No. 797,841, filed Feb. 10, 1969, now abandoned.

BACKGROUND OF THE INVENTION

This invention concerns two-cycle engine braking, and particularly concerns an improved vehicular engine brake assembly.

Modern, high-powered two-cycle engines have been used in diverse applications including vehicles such as motorcycles. In comparison with a four-cycle engine of equivalent size, the two-cycle power plant furnishes a substantially smaller engine braking effect when the motorcycle is coasted in a closed throttle condition. A remedy for this shortcoming in compression braking for two-cycle engines is a device known in the art as a "compression release."

Compression braking effect in the closed throttle condition is afforded by the compression release by permitting the engine to displace the air mixture from the combustion chamber through a small orifice or passageway. A valve such as a poppet valve is arranged in the orifice or passageway so that the compression braking effect may be employed as required.

The principle of operation of the compression release engine brake is that when the engine throttle is closed and the vehicle coasted, the engine is driven, i.e. piston reciprocated, from the combined effects of rotational and vehicular inertia supplied to the engine through the drive train. Gaseous fluid which is compressed into the unswept volume of the cylinder as the piston ascends towards top dead center, is partially expelled through the open orifice of the compression release in proportion to the orifice size and rotating speed. When the orifice is closed, the gas is compressed to act as a spring to return the piston towards bottom dead center. When the orifice is open, a portion of the gas is expelled through the orifice and there is a corresponding energy loss. The piston absorbs energy from the inertial forces in returning towards bottom dead center and in drawing air into the combustion chamber through the orifice thus supplying the braking effect to the two-stroke engine. The optimum size of the orifice appears to be determined by the cylinder volume and engine r.p.m. and optimum sizes in relation to cylinder volumes are known in the art.

Heretofore compression releases generally used on motorcycles have exhausted, on the one hand, and withdrawn air, on the other, with respect to an unfiltered source. Corrosive materials found in dusty or mud covered environments often found access to the combustion chamber through the compression release thereby causing undesirable wear. Fuel mixture was expelled through the compression release onto the air cooled engine posing a potential fire hazard along with the undesirable mess. Furthermore, to equip an existing compression release with a filtered source of air often involved an intricate engineering problem in view of the limited space available on fin-equipped cylinder heads of two-cycle engines.

SUMMARY OF THE INVENTION AND OBJECTS

The invention includes a plug member having a passageway therethrough, including an inlet and outlet, and insertable through a wall of the engine combustion chamber in communication with the unswept volume. A poppet valve is mounted to modulate gas flow through the passageway in response to operator actuated control means. A member is arranged on the plug at the passageway outlet to receive gases from the engine combustion chamber and to prevent ingestion of airborne particles into the combustion chamber.

An object of the invention is to provide an improved vehicular engine brake assembly affording protection to the engine associated therewith from ingestion of wear inducing foreign materials.

Another object of the invention is to provide an improved compression release assembly which may be easily installed in cramped spaces commonly found on motorcycle engine cylinder heads.

Another object of the invention is to provide an improved engine brake assembly configurated for rapid manufacture and which is simple in design and construction.

Another object of the invention is to provide an improved engine brake assembly having a one-way check valve arrangement which serves to preclude ingestion of airborne particles into the engine combustion chamber.

Further objects and features of the invention will be best understood by reference to the following specification taken in connection with the accompanying drawing.

BRIEF DESCRIPTION OF THE DRAWING

FIG. 1 is an elevational view of a motorcycle vehicle equipped with an improved engine brake assembly of the present invention.

FIG. 2 is a greatly enlarged view, partially in section, representing the encircled portion 2—2 of FIG. 1 and illustrating a first form of the invention.

FIG. 3 is a transverse sectional view along the line 3—3 of FIG. 2.

FIG. 4 is a fragmentary longitudinal sectional view of a second form of engine brake assembly.

FIG. 5 is a transverse sectional view along the line 5—5 of FIG. 4.

DESCRIPTION OF THE PREFERRED EMBODIMENTS

Figure 6:
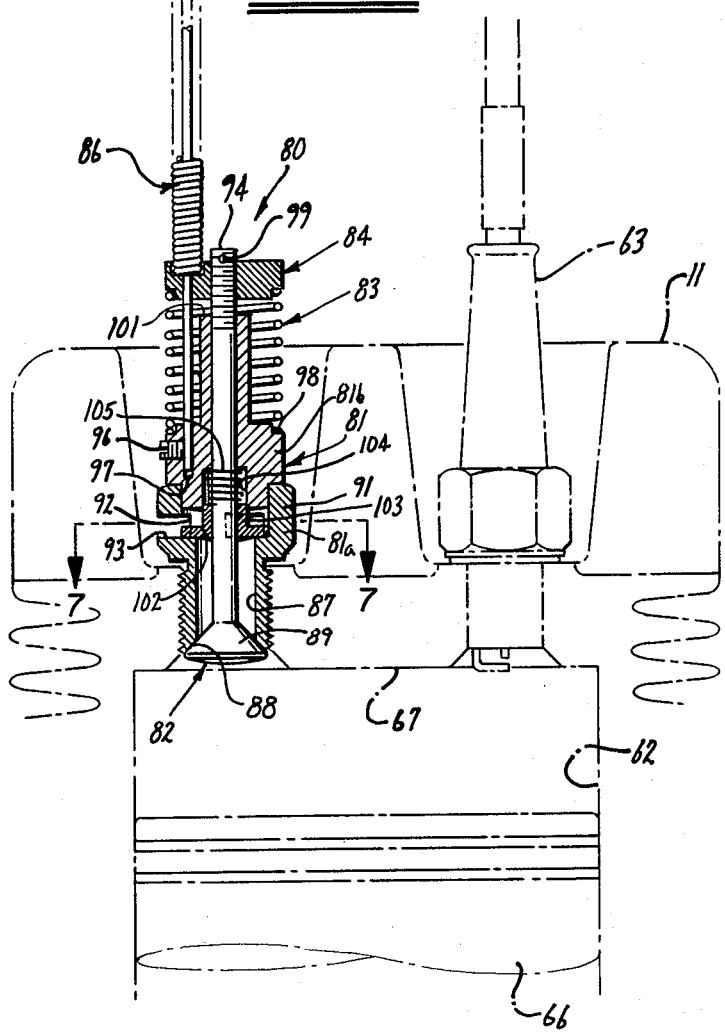
FIG. 6 is a view like FIG. 2 but illustrating a third form of the invention.

There is shown in FIG. 1 of the drawing an improved vehicle engine brake assembly 10 operatively mounted in a two-cycle engine 11 of a motorcycle 12. Being of conventional arrangement, the motorcycle 12 is driven at the rear wheel 13 through a conventional drive train from the engine 11 which includes the rear chain 14. Thus, it is to be understood that the wheel 13 is mechanically coupled to the two-cycle engine of the motorcycle.

FIRST EMBODIMENT (FIGS. 2 AND 3)

The engine brake assembly 10 is responsive to a lever actuated control cable 16 of the Bowden cable type, the actuating lever 17 being arranged at the left-hand side of the motorcycle handle bar 18. The lower end of the control cable 16 is operatively secured to portions of the engine brake assembly mounted on the vehicle's engine 11, described below and as shown in FIG. 2. Those portions of the engine brake assembly mounted upon the engine include a plug member 19, a collector member 21 and a poppet valve arrangement 22 including a compression valve spring 23 and spring keeper 24. Connecting the collector 21 to a controlled source of air such as the air cleaner 26 or exhaust manifold 27 is a gas conduit 28.

The plug member 19 is threadably mounted in an opening 31 provided in the cylinder head 32 of the engine and to this end a lower portion 33 of the plug of reduced diameter is equipped with threads. Upwardly from the threaded portion 33 the plug may have a hexagonal body portion 34 to facilitate the use of a wrench during installation. The body portion 34 may terminate in a substantially flat diametral plane 35. Extending outwardly from the body portion 34 is a guide neck 36 having a bore 37 complementary in diameter to slidably receive a stem 38 of the poppet valve 22. The exterior of the neck may be threaded to receive a fastener 39 for holding the collector 21 in the selected position with respect to the diametral face 35 of the body portion 34.

As shown in FIGS. 2 and 3, the collector 21 includes a circular body 41 having depending therefrom a circular skirt-like wall 42 which defines a chamber 43. The gas conduit 28 is suitably secured as by welding to the collector 21 through the wall portion thereof permitting access to the chamber 43. The body portion 41 of the collector is equipped with an opening 44 so that the collector with the attached conduit 28 may be received over the neck 39 of the plug member. The diametral face 35 of the plug member is relieved to receive and seat the wall 42 of the collector as shown in FIG. 2. An upper face of the body portion 41 of the collector is suitably relieved to receive the lower turns of the valve spring 23.

To afford an anchor point for an inner member 45 of the control cable 16, the body portion of the collector is provided with a set screw 46 arranged as shown in FIG. 2. An outer member 47 of the control cable 16 is received in a circular recess provided in the keeper 24, as shown in FIG. 2.

An orifice or passageway 51 is arranged in the plug member 19 centrally thereof. The passageway or orifice 51 extends from the lower end of the plug member to just short of the diametral face 35. As shown in FIG. 3, the orifice 51 opens onto the face 35 through a group of inclined openings 52, a group of six openings being shown by way of example.

The poppet valve 22 includes a head 56 adapted to sealingly close the orifice 51 by engagement with a valve seat 57 on the plug.

It will be recognized that the cylinder head 32 of the two-cycle engine 11 is provided with an array of fins 61 to afford rapid transfer of heat from the engine combustion chamber 62 to the atmosphere. The distance between the top of the engine head and the adjacent structure of the motorcycle is comparatively small and space is quite limited. Thus, it is desirable that the vehicle engine brake assembly 10 be compact for installation. For example, the engine mounted portions of the vehicle engine brake assembly 10 may be on an overall size approximate to that of the spark plug 63 also mounted in the engine head 11. The threaded portion 33 of the plug received in the head may be of a diameter of substantially 14 millimeters, like that of the plug 63, so that the device 10 may be used on two-cycle engines having small areas available in the cylinder head for openings. It will also be recognized that the opening 31 into the cylinder head permits access to the unswept volume of the cylinder as indicated in height by the arrow 64 extending between the top of a piston 66 at top dead center and the lower surface 67 of the cylinder head.

OPERATION

The engine brake assembly 10 is installed in the vehicle such as the motorcycle 12 through a series of steps which includes preparing a threaded opening 31 in the cylinder head so that the threaded portion of the plug 33 may be received therein. The plug member 19 is arranged in the opening 31 to seat securely therein against a washer 68. The poppet valve 22 is arranged in the plug member at this time. The collector 21 is placed over the neck of the plug and turned to the most desirable location so that the gas conduit 28 takes as short a route as possible to the selected air source which may be the induction manifold or the exhaust manifold of the engine.

Having in mind that the fins 61 are closely spaced, the conduit 28 may be bent to take the desired direction. Once the conduit has been positioned, the collector member is secured in place with the nut 39 received over the threaded end of the plug neck 36. The valve spring 23 and keeper 24 may be installed to bias the poppet valve into the closed position. The lower end of the control cable 16 is secured, the inner member 45 being held secured to the collector by the set screw 46, the outer member 47 being received in the recess provided on the keeper 24. The upper end of the control cable is secured to the control lever 17, the outer member of the cable 47 being received in a suitable abutment while the inner member 46 is secured to the lever 17.

Squeezing the control lever 17 towards the handle bar compresses the spring 23 and depresses the valve to an open condition permitting gases to exit on the upstroke of the piston 66 through the orifice 51, openings 52, chamber 43 through the conduit 28 to the controlled air source such as the induction or exhaust manifolds. On the downstroke of the piston 66 when the valve is open, the direction of gas flow is reversed and air mixture is drawn into the combustion chamber 62 from the filtered air source. With this arrangement air-fuel mixture is contained within the vehicle and is not exhausted onto the surroundings or onto the hot engine fins 61 thus eliminating a potential fire hazard and other messiness. On the intake stroke with the valve 22 in the open condition, the air mixture drawn into the combustion chamber 62 comes from a filtered source or a source of relatively clean air thus eliminating contamination from dirt and corrosive materials present in the atmosphere where motorcycles are driven.

When the engine 11 is supplying power to the rear wheel 13, the valve 28 is closed thus blocking the orifice or passageway 51. Valve closure is effected by simply releasing the lever 17 whereby the spring 23 urges the valve keeper 24 towards an upper position thus bringing the poppet valve into sealing engagement with the seat or valve part 57. The valve may be used effectively for clearing a flooded two-stroke engine as well as for starting the engine when it is desired to bring the piston of a large displacement engine to just before top dead center to minimize injury from possible piston "kickback." Another use for the assembly 10 is for stopping the engine completely when the vehicle has come to rest.

SECOND FORM OF THE INVENTION (FIGS. 4 AND 5)

There is shown in FIGS. 4 and 5 a second form of the vehicle engine brake, there designated 70. The engine brake 70 includes parts previously described in connection with the engine brake 10 and these are the control cable 16, control lever 17, collector 21, poppet valve 22, valve spring 23, spring keeper 24, all of which may be fabricated as described previously.

A plug member 71 includes an orifice or passageway 72 extending from the lower end of the plug through to the diametral or flat face 73. The orifice 72 is of substantially a constant diameter. A neck 74 of the plug 71 includes parallel faces 76 and two curve threaded portions 77 which may receive a nut 39 for holding the collector onto the face 73. The neck 74 is provided with an opening for receiving therethrough the stem of the valve 22. As shown in FIG. 5, the diameter of the neck measured across the threaded portions 77 is greater than the diameter of the orifice 72 and the width of the neck across the parallel faces 76, is substantially narrower than the diameter of the orifice 72 affording the crescent-shape openings shown in FIG. 5, permitting gas flow from the passageway or orifice 72 into the chamber 43 of the collector 21, as well as in the opposite direction.

THIRD FORM OF THE INVENTION (FIGS. 6 AND 7)

Figure 7:
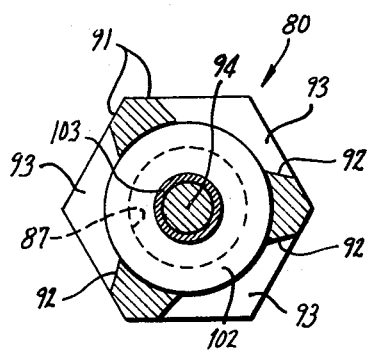
FIG. 7 is a transverse sectional view along the line 7—7 of FIG. 6.

There is shown in FIGS. 6 and 7 a third form of the vehicle engine brake, there designated 80, and incorporating a one-way check valve. The engine brake 80 includes a plug member 81 having portions press fitted together, a lower plug portion 81a and upper plug portion 81b. This form of the invention also includes parts which have been described previously and these are the poppet valve 82, valve spring 83, spring keeper 84, and the control cable 86.

A passageway or orifice 87 is centrally arranged in the lower portion, 81a of the plug member, the inner end of the passageway serving as a gas inlet and the outer portion serving as a gas outlet. A valve seat or port 88 is arranged in the gas inlet to accommodate the head 89 of the poppet valve.

As shown in FIG. 7, to facilitate the use of the wrench in the installation of the assembly 80, a portion thereof is hexagonal in cross-section as indicated at 91. Slots 92 are arranged transversely to the axis of the plug member into the hexagonal portion, the slots being in communication with the passageway 87. The upper portion 81b of the plug member is received in a press fit in the hexagonal body portion as shown in FIG. 6, the lower end of portion 81b being spaced from a surface 93 which surrounds the upper end of the passageway 87 and also serves as a valve seat as appears below. The valve stem 94 extends through a complementary valve guide passageway in member 81b so that movements of the poppet valve are suitably constrained. A projection 101 on the upper plug portion 81b serves as an abutment for the spring keeper 84 limiting the travel of the poppet valve. A cotter pin 99 extends through the end of the valve stem to ensure the parts are maintained together. To afford an anchor for the control cable 86, member 81b is equipped with a set screw 96 projectable laterally into a wire receiving passageway 97 to anchor the inner cable member. A shoulder-like recess 98 is provided on member 81b to receive the lower turns of the valve spring 83.

Within the cavity defined by surface 93 and the end of member 81b there is provided a one-way check valve which includes a disc-like member 102 having a collar 103 receivable in recess 104 formed in the lower portion of the member 81b. A spring 105 is disposed in the recess to ensure that the disc-like member suitably seats against the surface 93.

When the poppet valve 82 is in the open condition, the upstroke of the piston 66 will force gas through the passageway 87 thus raising the disc-like member 102 off the seat 93 permitting gas to exit from the slots 92. After the piston has reached top dead center and commences the downstroke, a marked pressure decrease occurs within the combustion chamber causing member 92 to return to the lower condition and seat upon surface 93 thereby preventing ingestion of airborne particles into the combustion chamber. The valve member 102 and spring 105 are selected to provide a system whereby the member 102 closely follows the movements of the piston.

While there has been described what is at present considered to be the preferred embodiments of the invention, the invention shall not be limited except as set forth in the following claims.

I claim:

1. In a motorcycle having a supplemental engine braking device, a frame, front and rear ground-engaging wheels carried by the frame, handle bars carried by the frame for guiding the front ground engaging wheel, an internal combustion engine mounted on the frame, means forming a driving connection between the internal combustion engine and the rear ground engaging wheel, said engine having a housing, a piston slidably mounted in the housing and forming a compression chamber in the housing, said housing having a hole opening into the portion of the combustion chamber which is not swept by the piston, intake means external of said housing for supplying combustible gases to said combustion chamber, a braking device mounted on said housing and extending into said hole, said braking device including a body having a portion thereof extending into said hole in said housing, said body having a flow passage extending longitudinally of the body and opening through the portion of the body extending into said hole and being in communication with said combustion chamber, said body being formed with an annular valve seat on said portion of said body extending into the hole and circumscribing said flow passage, a valve member having a valve stem, valve stem guiding means carried by the body for slidably receiving the valve stem to permit said valve member to move between open and closed positions with respect to said valve seat to thereby permit gases from the combustion chamber to pass into said flow passage when said valve member is in an open position and to prevent the passage of the gases from the combustion chamber into the flow passage when said valve member is in a closed position, spring means, means retaining said spring means so that said spring means is carried by the body and supplies a force to the valve stem so that the valve member is yieldably urged to a closed position, said body having at least one additional flow passage therein, means exclusively external of said housing and coupling said additional flow passage to said intake means in such a manner that said additional flow passage is exposed to atmospheric pressure, a control cable having one end disposed in the vicinity of the handle bars and having the other end coupled to the braking device and means connected to the end of the control cable disposed in the vicinity of the handle bars for causing operation of the control cable to effect movement of the valve member towards an open position against the force of the yieldable means to permit gasses being compressed in the combustion chamber during the compression stroke of the piston to escape through the first named flow passage, the additional flow passage and into the intake means whereby such gases which are discharged during braking of the motorcycle will be sucked back into the combustion chamber during the return stroke of the piston.

2. In a braking device for use with a motorcycle driven by two-cycle internal combustion engine of the type having a housing, a piston mounted in the housing and forming a compression chamber in said housing with the housing having a hole therein extending therethrough and in communication with the combustion chamber and actuatable by the use of the control means accessible to the operator of the motorcycle, said device comprising a body adapted to be secured to said housing so that a portion of said body is adapted to extend into said hole, said body having a flow passage therein extending longitudinally thereof and opening through said portion of the body whereby said flow passage is in communication with said combustion chamber when said body is mounted on said housing, said body having an annular valve seat formed on said portion of the body circumscribing said flow passage, a valve member having a valve stem, valve stem guiding means carried by the body for slidably receiving the valve stem to permit said valve member to move between open and closed positions with respect to said valve seat whereby when said valve member is in an open position gases from the combustion chamber can pass into the flow passage and when said valve member is in a closed position gases from the combustion chamber cannot pass into said flow passage, spring means, means retaining said spring means so that it is carried by the body concentric to the valve stem and supplies a force to the valve stem so that the valve member is yieldably urged to a closed position, said body having at least one additional flow passage opening to the atmosphere and in communication with said first named flow passage whereby gases flowing from said combustion chamber into said first named flow passage can flow to the atmosphere, check valve means within the body and movable between open and closed positions with respect to said additional flow passage and operable independently of the valve member and in an open position permitting the flow of gases from the first named flow passage and the additional flow passage to the atmosphere and in a closed position preventing flow of gases from the atmosphere into said first named flow passage, said check valve means including additional spring means concentric with said valve stem and exerting a force independent of said first named spring means and means connected to said valve stem and adapted to be connected to said control means whereby the valve member may be moved to an open position against the force of the spring means.

3. A device as in claim 2 wherein said body is formed with additional valve seat means circumscribing said additional flow passage and wherein said check valve means includes a valve member slidably mounted on said valve stem for movement between open and closed positions with respect to said additional valve seat means and wherein said additional spring means engages said additional valve member for yieldably urging said additional valve member towards a closed position.

4. A device as in claim 3 wherein said additional spring means exerts a force on said additional valve member which is less than the force exerted by said first named spring means on said first named valve member.

5. A device as in claim 3 wherein said body is formed and said first named and additional spring means are positioned with respect to said body so there is no significant contact between said first named and additional spring means and the gases passing from the combustion chamber through said first named and additional flow passages to the atmosphere.

6. In a motorcycle having a supplemental engine braking device, a frame, front and rear ground-engaging wheels carried by the frame, handle bars carried by the frame for guiding the front ground-engaging wheel, an internal combustion engine mounted on the frame, means forming a drive connection between the internal combustion engine and the rear ground-engaging wheel, said engine having a housing, a piston slidably mounted in said housing and forming a compression chamber in the housing, said housing having a hole therein opening into the combustion chamber in the portion thereof which is not swept by the piston, the improvement comprising a braking device adapted to be mounted on said housing and extending into said hole, said braking device including a body having a portion thereof extending into said hole, said body having a flow passage extending longitudinally thereof and opening through said portion into said combustion chamber, said portion of said body being formed within an annular valve seat circumscribing said flow passage, a valve member having a valve stem, valve stem guiding means carried by the body for slidably receiving the valve stem to permit said valve member to move between open and closed positions with respect to said valve seat whereby when said valve member is in an open position gases can escape from said combustion chamber into said flow passage and when said valve member is in a closed position gases from said combustion chamber are prevented from escaping into said flow passage, spring means, means retaining said spring means so that said spring means is carried by the body and supplies a force to the valve stem so that the valve member is yieldably urged into a closed position, said body having at least one additional flow passage therein opening to the atmosphere in communication with said flow passage whereby gases passing from said combustion chamber into said first named flow passage can flow solely to the atmosphere, yieldable check valve means carried by the body operable independently of the valve member and movable between open and closed positions with respect to said additional flow passage whereby in the open position of said check valve means gases from said first named flow passage can escape through said additional flow passage to the atmosphere and in the closed position, gases from the atmosphere are prevented from flowing through the additional flow passage into said first named passage, said valve stem guiding means carried by the body being disposed above said first named and additional flow passages and being separate from said check valve means, said spring means being disposed exteriorly of said valve stem guiding means and having at least a portion thereof extending beyond said valve stem guiding means, said body being provided with additional valve seat means circumscribing said additional flow passage, said check valve means including an additional valve member slidably mounted on said valve stem and movable between open and closed positions with respect to said additional valve means, said check valve means including additional spring means carried by the body yieldably urging said additional valve member to a closed position, said additional spring means applying force to said additional valve member which is significantly less than the force supplied by the first named spring means to said first named valve member, said body being formed with a well carried by the body, said additional spring means being disposed in said well, said additional valve member having a cylindrical portion adapted to seat in said well to substantially seal said well from said gases when said additional valve member is in an open position, said body having a chamber formed about said additional valve member which is open to the additional flow passage, a control member adapted to be disposed in the vicinity of the handle bars and a control cable connecting said control member to said braking device whereby upon operation of said control member by the operator of the vehicle, said valve member is moved to an open position against force of the first named spring means so that braking is applied to the motorcycle by said engine.

7. In a motorcycle having a supplemental engine braking device, a frame, front and rear ground-engaging wheels carried by the frame, handle bars carried by the frame for guiding the front ground-engaging wheel, an internal combustion engine mounted on the frame, means forming a drive connection between the internal combustion engine and the rear ground-engaging wheel, said engine having a housing, a piston slidably mounted in said housing and forming a compression chamber in the housing, said housing having a hole therein opening into the combustion chamber in the portion thereof which is not swept by the piston, the improvement comprising a braking device adapted to be mounted on said housing and extending into said hole, said braking device including a body having a portion thereof extending into said hole, said body having a flow passage extending longitudinally thereof and opening through said portion into said combustion chamber, said portion of said body being formed within an annular valve seat circumscribing said flow passage, a valve member having a valve stem, valve stem guiding means carried by the body for slidably receiving the valve stem to permit said valve member to move between open and closed positions with respect to said valve seat whereby when said valve member is in an open position gases can escape from said combustion chamber into said flow passage and when said valve member is in a closed position gases from said combustion chamber are prevented from escaping into said flow passage, spring means, means retaining said spring means so that said spring means is carried by the body concentric with said valve stem and supplies a force to the valve stem so that the valve member is yieldably urged into a closed position, said body having at least one additional flow passage therein opening to the atmosphere in communication with said flow passage whereby gases passing from said combustion chamber into said first named flow passage can flow solely to the atmosphere, yieldable check valve means carried by the body including additional spring means concentric with said valve stem operable independently of the valve member and movable between open and closed positions with respect to said additional flow passage whereby in the open position of said check valve means gases from said first named flow passage can escape through said additional flow passage to the atmosphere and in the closed position, gases from the atmosphere are prevented from flowing through the additional flow passage into said first named passage, said valve stem guiding means carried by the body being disposed above said first named and additional flow passages and being separate from said check valve means, said first named spring means being disposed exteriorly of said valve stem guiding means and having at least a portion thereof extending beyond said valve stem guiding means, said first named and additional spring means and said body being formed so that there is no significant contact between said first named and additional spring means and the gases passing from the combustion chamber through the first named and additional flow passages to the atmosphere, a control member adapted to be disposed in the vicinity of the handle bars and a control cable connecting said control member to said braking device whereby upon operation of said control member by the operator of the vehicle, said valve member is moved to an open position against force of the first named spring means so that braking is applied to the motorcycle by said engine.

8. In a motorcycle having a supplemental engine braking device, a frame, front and rear ground-engaging wheels carried by the frame, handle bars carried by the frame for guiding the front ground-engaging wheel, an internal combustion engine mounted on the frame, means forming a drive connection between the internal combustion engine and the rear ground-engaging wheel, said engine having a housing, a piston slidably mounted in said housing and forming a compression chamber in the housing, said housing having a hole therein opening into the combustion chamber in the portion thereof which is not swept by the piston, the improvement comprising a braking device adapted to be mounted on said housing and extending into said hole, said braking device including a body having a portion thereof extending into said hole, said body having a flow passage extending longitudinally thereof and opening through said portion into said combustion chamber, said portion of said body being formed within an annular valve seat circumscribing said flow passage, a valve member having a valve stem, valve stem guiding means carried by the body for slidably receiving the valve stem to permit said valve member to move between open and closed positions with respect to said valve seat whereby when said valve member is in an open position gases can escape from said combustion chamber into said flow passage and when said valve member is in a closed position gases from said combustion chamber are prevented from escaping into said flow passage, spring means, means retaining said spring means so that said spring means is carried by the body and supplies a force to the valve stem so that the valve member is yieldably urged into a closed position, said body having at least one additional flow passage therein opening to the atmosphere in communication with said flow passage whereby gases passing from said combustion chamber into said first named flow passage can flow solely to the atmosphere, yieldable check valve means carried by the body operable independently of the valve member and movable between open and closed positions with respect to said additional flow passage whereby in the open position of said check valve means gases from said first named flow passage can escape through said additional flow passage to the atmosphere and in the closed position, gases from the atmosphere are prevented from flowing through the additional flow passage into said first named passage, said valve stem guiding means carried by the body being disposed above said first named and additional flow passages and being separate from said check valve means, said spring means being disposed exteriorly of said valve stem guiding means and having at least a portion thereof extending beyond said valve stem guiding means, said body being provided with additional valve seat means circumscribing said additional flow passage and wherein said check valve means includes an additional valve member slidably mounted on said valve stem and movable between open and closed positions with respect to said additional valve seat means, said check valve means including additional spring means carried by the body and yieldably urging said additional valve member to a closed position, said additional spring means supplying a force to said additional valve member which is significantly less than the force supplied by said first named spring means to said first named valve member, a control member adapted to be disposed in the vicinity of the handle bars and a control cable connecting said control member to said braking device whereby upon operation of said control member by the operator of the vehicle, said valve member is moved to an open position against the force of the first named spring means so that braking is applied to the motorcycle by said engine.

9. In a motorcycle having a supplemental engine braking device, a frame, front and rear ground-engaging wheels carried by the frame, handle bars carried by the frame for guiding the front ground-engaging wheel, an internal combustion engine mounted on the frame, means forming a drive connection between the internal combustion engine and the rear ground-engaging wheel, said engine having a housing, a piston slidably mounted in said housing and forming a compression chamber in the housing, said housing having a hole therein opening into the combustion chamber in the portion thereof which is not swept by the piston, the improvement comprising a braking device adapted to be mounted on said housing and extending into said hole, said braking device including a body having a portion thereof extending into said hole, said body having a flow passage extending longitudinally thereof and opening through said portion into said combustion chamber, said portion of said body being formed within an annular valve seat circumscribing said flow passage, a valve member having a valve stem, valve stem guiding means carried by the body for slidably receiving the valve stem to permit said valve member to move between open and closed positions with respect to said valve seat whereby when said valve member is in an open position gases can escape from said combustion chamber into said flow passage and when said valve member is in a closed position gases from said combustion chamber are prevented from escaping into said flow passage, spring means, means retaining said spring means so that said spring means is carried by the body and supplies a force to the valve stem so that the valve member is yieldably urged into a closed position, said body having at least one additional flow passage therein opening to the atmosphere in communication with said flow passage whereby gases passing from said combustion chamber into said first named flow passage can flow solely to the atmosphere, yieldable check valve means carried by the body operable independently of the valve member and movable between open and closed positions with respect to said additional flow passage whereby in the open position of said check valve means gases from said first named flow passage can escape through said additional flow passage to the atmosphere and in the closed position, gases from the atmosphere are prevented from flowing through the additional flow passage into said first named passage, said valve stem guiding means carried by the body being disposed above said first named and additional flow passages and being separate from said check valve means, said spring means being disposed exteriorly of said valve stem guiding means and having at least a portion thereof extending beyond said valve stem guiding means, said body being provided with additional valve seat means circumscribing said additional flow passage, said check valve means including an additional valve member slidably mounted on said valve stem and movable between open and closed positions with respect to said additional valve seat means, said check valve means including additional spring means carried by the body and yieldably urging said additional valve member to a closed position, said additional spring means applying a force to said additional valve member which is significantly less than the force applied by said first named spring means to said first named valve member, said first named additional spring means being mounted so that the movement of said first named valve member does not affect the force exerted by said additional spring means, a control member adapted to be disposed in the vicinity of the handle bars and a control cable connecting said control member to said braking device whereby upon operation of said control member by the operator of the vehicle, said valve member is moved to an open position against the force of the first named spring means so that braking is applied to the motorcycle by said engine.

* * * * *

PO-1050
(5/69)

UNITED STATES PATENT OFFICE
CERTIFICATE OF CORRECTION

Patent No. 3,667,435          Dated June 6, 1972

Inventor(s) Richard M. Bygdnes

It is certified that error appears in the above-identified patent and that said Letters Patent are hereby corrected as shown below:

Delete patent claim No. 1.

Signed and sealed this 31st day of October 1972.

(SEAL)
Attest:

EDWARD M. FLETCHER, JR.          ROBERT GOTTSCHALK
Attesting Officer          Commissioner of Patents